(12) United States Patent  
Thomas et al.

(10) Patent No.: US 6,308,500 B1  
(45) Date of Patent: Oct. 30, 2001

(54) SEALING TOOL AND PROCESS FOR SEALING PACKAGES

(75) Inventors: Ulrich Thomas, Breidenbach-Oberdieten; Rolf Blöcher, Breidenbach, both of (DE); Celestino Inverardi, Corzano (IT)

(73) Assignee: Tiromat Kramer +Grebe GmbH & Co. KG, Bieden Kopf- Wallau (DE)

( * ) Notice: Subject to any disclaimer, the term of this patent is extended or adjusted under 35 U.S.C. 154(b) by 0 days.

(21) Appl. No.: 09/437,950

(22) Filed: Nov. 10, 1999

(30) Foreign Application Priority Data

Nov. 12, 1998 (DE) .............................................. 198 52 113

(51) Int. Cl.7 .................................................... B65B 47/00
(52) U.S. Cl. .................................. 53/453; 53/478; 53/559
(58) Field of Search .............................. 53/453, 478, 480, 53/559, 329.2, 313, 374.8, 374.6; 425/515; 156/308.4, 156, 292, 290

(56) References Cited

U.S. PATENT DOCUMENTS

| | | | |
|---|---|---|---|
| 4,372,098 | * 2/1983 | Mason | 53/453 |
| 5,014,500 | * 5/1991 | Robache | 53/559 |
| 5,163,269 | * 11/1992 | Williams | 53/453 |
| 5,307,610 | * 5/1994 | Schneider et al. | 53/559 |

FOREIGN PATENT DOCUMENTS

| | | |
|---|---|---|
| 1135817 | 3/1963 | (DE) . |
| 59 503 | 12/1967 | (DE) . |
| 43 36 274 C2 | 10/1995 | (DE) . |

* cited by examiner

Primary Examiner—Peter Vo  
Assistant Examiner—Sam Tawfik  
(74) Attorney, Agent, or Firm—Akin, Gump, Strauss, Hauer & Feld, L.L.P.

(57) ABSTRACT

A sealing tool for sealing a package trough with a covering film includes a bottom part, side parts oriented transverse and side parts oriented parallel to the direction of package trough feed, wherein the side parts oriented transverse to the direction of feed can be displaced downwardly, while the other parts of the bottom sealing tool are fixed in their spatial arrangement, relative to the frame of the machine.

11 Claims, 4 Drawing Sheets

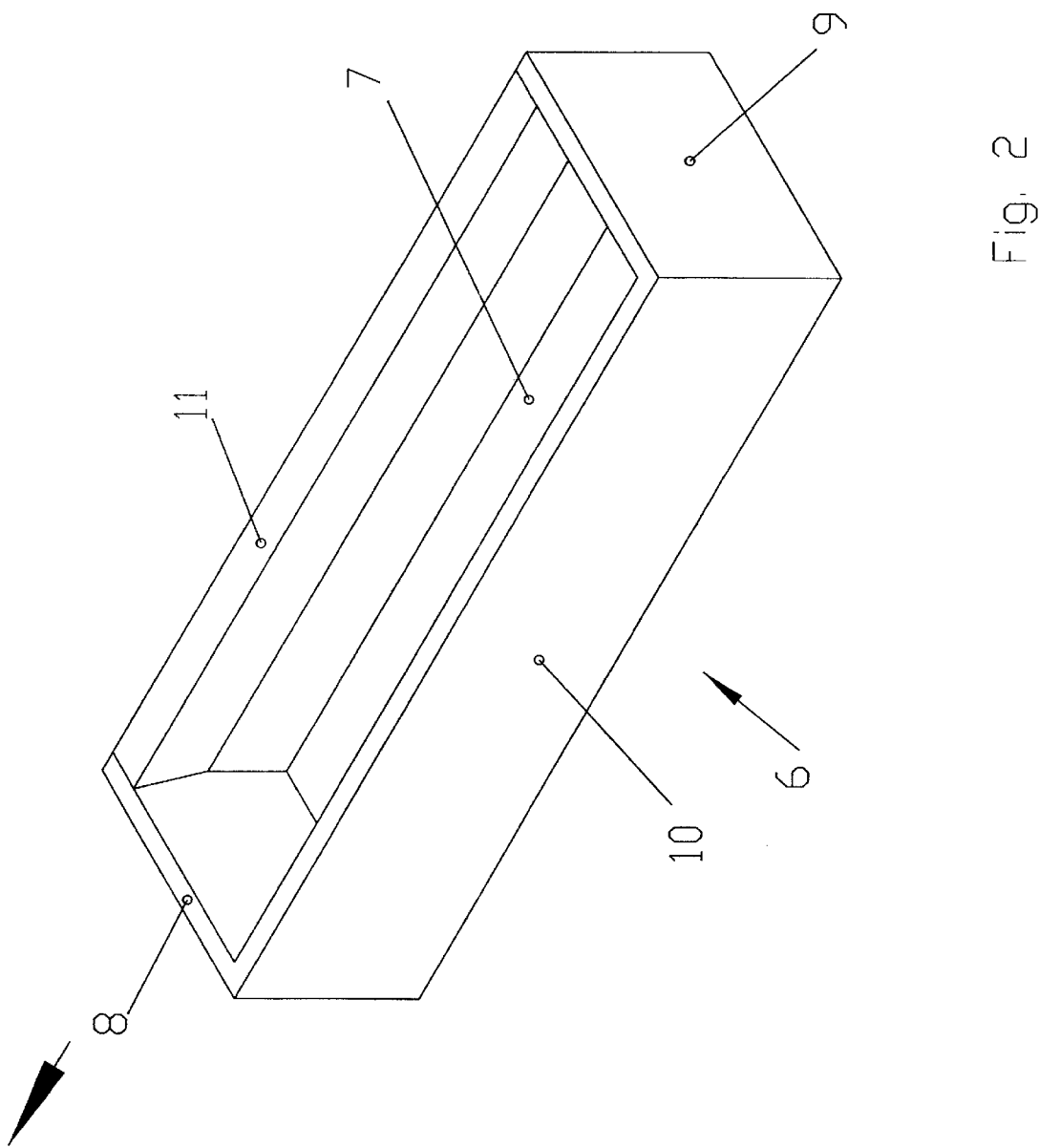

SEALING TOOL AND PROCESS FOR SEALING PACKAGES

BACKGROUND OF THE INVENTION

The present invention relates to a sealing tool and a process for sealing a package trough with a covering film.

Packages, particularly packages for foods, are becoming increasingly important today in the preservation of foods. For packaging, the foods are placed in a so-called package trough and the package trough is then closed in a gas-tight manner with a covering film by sealing the covering film onto the edge of the package trough.

Usually, the package troughs are semi-continuously sealed with a covering film in so-called sealing stations. To this end, the package trough filled with the packaged good and the covering film are initially fed into the sealing station. As soon as the package trough is situated in the sealing station, a first bottom sealing tool is raised vertically from below and pressed against a second, heated top sealing tool, which is located above the covering film. As a result of the pressure and temperature applied, the covering film and the edge of the package trough, which are situated between the sealing tools, are sealed. In order to obtain gas-tight seal seam, it is important that the seal seam have a certain width and that the seal seam be essentially situated in the middle of the edge of the package trough. After sealing, the first sealing tool is lowered back beneath the freshly sealed package trough, and the sealed package trough is fed on to the cutting station.

Although this type of a sealing station has been in use for many years, it nevertheless displays a number of disadvantages. For instance, package troughs having an undercut cannot be sealed with such a sealing tool, because the first sealing tool collides with the undercut during lifting and lowering and thereby destroys it. However, even with packages that do not have an undercut, problems repeatedly occur during the sealing of heavily loaded package troughs, because these package troughs sag. Because of this sagging, the package troughs tilt and the first sealing tool on its ascent collides with the corners and thereby destroys or deforms them.

SUMMARY OF THE INVENTION

It is therefore an object of the present invention to provide a device by which a package trough having an undercut can be sealed and which does not show the other disadvantages of the prior art.

According to the present invention, this object is achieved by providing a bottom sealing tool for sealing a package trough with a covering film, in which the sealing tool comprises a bottom part, side parts oriented transverse and side parts oriented parallel to the direction of package trough feed, wherein the side parts oriented transverse to the direction of package trough feed can be displaced downwardly, while the other parts of the bottom sealing tool are fixed in their spatial arrangement relative to the frame of the machine.

In the meaning of the invention "fixed in their spatial arrangement relative to the frame of the machine" does not mean that the part has to be in a totally rigid arrangement. It may, in fact, move by several millimeters.

Preferably, the side parts oriented transverse to the direction of package trough feed can be displaced vertically downwardly.

In another preferred embodiment, the side parts that do not change their position relative to the frame of the machine have on their top a surface with a low coefficient of friction. This surface can either be polished or coated with Teflon® or a similar material.

Preferably, the side parts oriented parallel to the direction of the package trough feed taper downwardly from the top to the bottom, so that package troughs having one or more undercut(s) oriented parallel to the direction of package feed can be sealed with the parts.

Another bottom sealing tool according to the present invention preferably serves the purpose of sealing at least two adjacent package troughs. In addition to the bottom part, the side parts oriented transverse and the side parts oriented parallel to the direction of package trough feed, such a sealing tool also has at least one middle part, wherein the side parts oriented transverse to the direction of package feed can be displaced downwardly, while the other parts of the bottom sealing tool are fixed in their spatial arrangement relative to the frame of the machine.

Preferably, the side parts oriented transverse to the direction of package trough feed can be displaced vertically downwardly.

In yet another preferred embodiment, the middle parts and the side parts oriented parallel to the direction of package trough feed have on their top a surface with a low coefficient of friction. This surface can either be polished or coated with Teflon® or similar material. Preferably, the middle part and/or the side parts oriented parallel to the direction of package trough feed taper downwardly from the top to the bottom so that package troughs having one or more undercut(s) oriented parallel to the direction of package trough feed can be sealed with the parts.

Another object of the present invention is to provide a process for sealing package troughs that does not show the disadvantages of the prior art.

According to the present invention, this object is achieved by providing a process for sealing a package trough with a covering film by using the bottom sealing tool according to the present invention, wherein:

the covering film and the package trough are fed into the sealing station and optionally fixed and pressed between the bottom sealing tool and the top sealing tool, heated and thereby sealed;

the displaceable parts of the bottom sealing tool are lowered; and the finished package is moved on.

In a preferred embodiment of the process according to the present invention, the displaceable parts of the bottom sealing tool are displaced vertically downwardly.

An advantage of the present invention is that a package trough having one or more undercuts oriented parallel to the direction of package trough feed can be sealed with a covering film. Another advantage of the invention is that heavily loaded package troughs are supported by the side part and/or middle part which is/are fixed in its/their spatial arrangement and which therefore no longer sag(s), so that the sealing tool no longer destroys the package trough during its ascents and descents.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings:

FIG. 2 is a top perspective view of a sealing tool according to the present invention for sealing a package trough with a covering film.

DETAILED DESCRIPTION OF THE INVENTION

Figure 1:
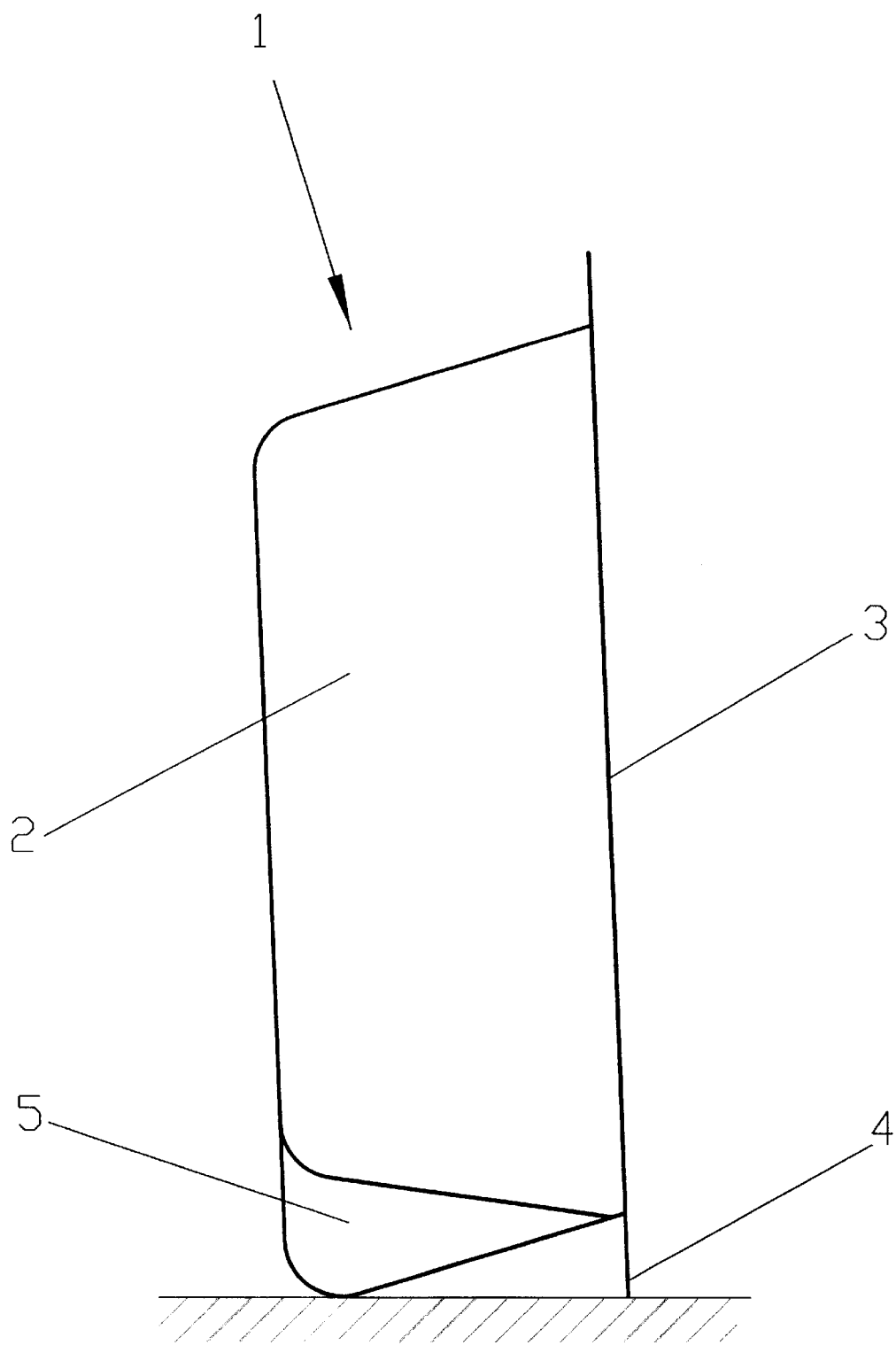
FIG. 1 is a side view of a package having an undercut.

FIG. 1 illustrates a package having undercuts. The package 1 comprises a package trough 2 and a covering film 3. The package shown is a so-called stand-up package, which stands with its narrow side on the surface 4 shown. The stand-up package has undercuts 5 in order to stabilize the package in its upright position.

FIG. 2 illustrates the bottom sealing tool 6 according to the present invention for sealing a package trough with a covering film. The sealing tool has a bottom part 7, side parts 8, 9 oriented transverse and side parts 10, 11 oriented parallel to the direction of package trough feed. The arrow indicates the direction of feed of the sealed package troughs. The side part 11 is thicker on its upper edge than on its lower edge, so that package troughs having an undercut on the side facing the side part 11 can be sealed with this sealing tool. If a package trough having two undercuts is to be sealed, the side part 10 can also be designed in the same way as the side part 11. The side parts 8, 9 can be displaced vertically downwardly, so that the package trough can be fed on in the direction given by the arrow after sealing, without damage being caused to the undercut.

Figure 3A:
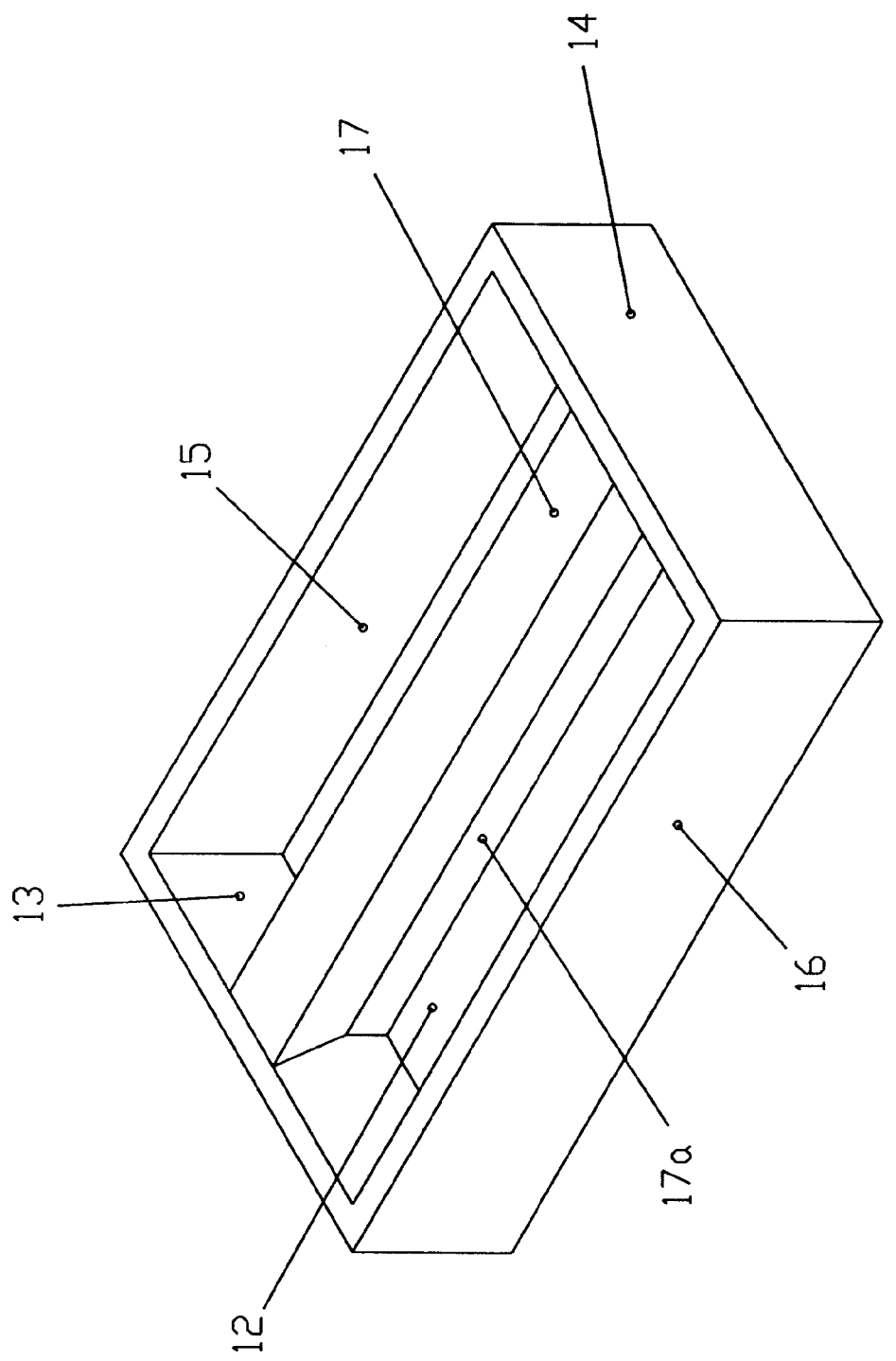
FIGS. 3a and 3b are perspective views of a bottom sealing tool according to the present invention for sealing two package troughs with a covering film.

FIG. 3a illustrates a sealing tool according to the present invention for sealing two package troughs with covering films. In addition to the bottom side 12, the side parts 13, 14 oriented transverse and the side parts 15, 16 oriented parallel to the direction of package trough feed, the tool has the middle parts 17, 17a. The middle part 17 tapers on both sides from top to bottom, so that package troughs having undercuts facing the middle parts 17, 17a can be sealed with the sealing tool. The middle part 17a has a constant cross-section. It will be understood by one skilled in the art that the middle parts 17 and 17a may be produced as one single part. It will also be understood by one skilled in the art that the middle part can also have a constant cross-section overall. In this case, packages having an undercut cannot be sealed. The middle part then only serves to support the film between the package troughs, so the film does not sag. It will also be understood that the side parts 15 and 16 can taper downwardly from top to bottom, so that package troughs having undercuts facing the side parts 15, 16 can be sealed with this sealing tool.

Figure 3B:
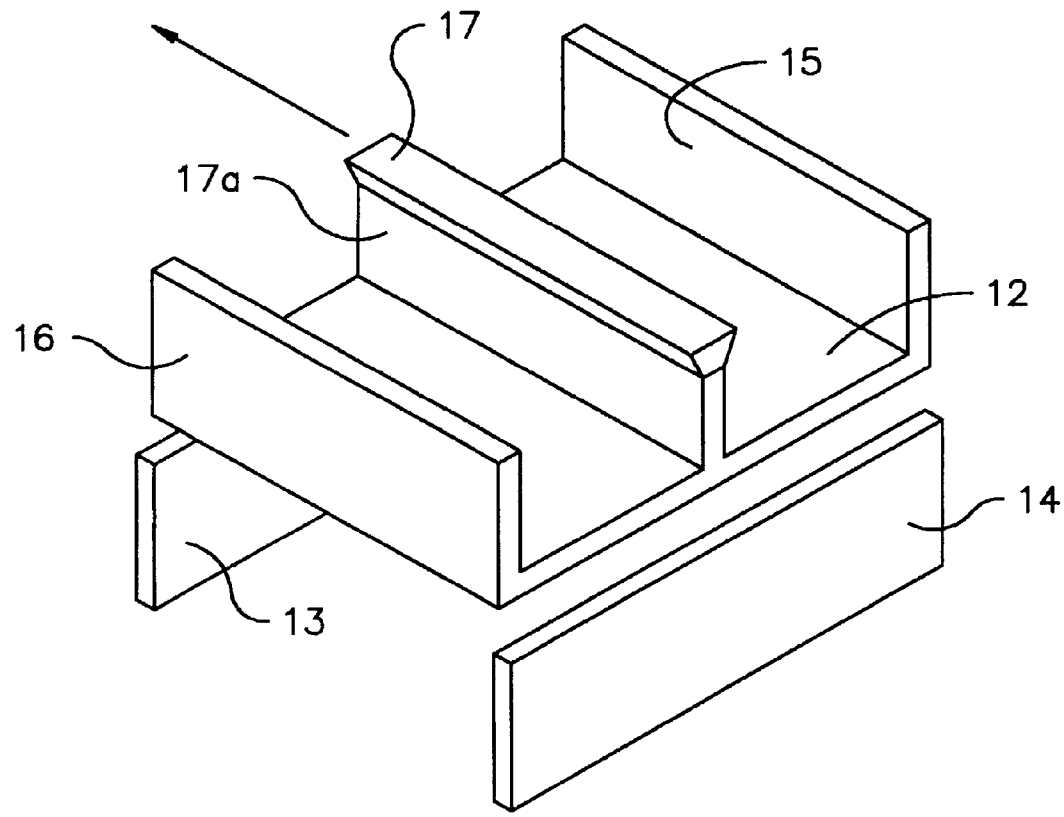

FIG. 3b illustrates the sealing tool according to FIG. 3a after lowering of the side parts 13, 14. After sealing, the parts 13, 14 of the sealing tool are lowered, whereas the parts 12, 15, 16, 17 and 17a are not lowered, but rather stay fixed in their spatial arrangement. The sealed package troughs can then be fed on in the direction of the arrow shown, parallel to the middle part 17, without damage being done to the undercuts of the package troughs.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A sealing tool (6) for sealing a package trough with a covering film, comprising a bottom part (7), a first side parts (8, 9) oriented transverse to a direction of package trough feed and a second side parts (10, 11) oriented parallel to a direction of package trough feed, wherein the first side parts (8, 9) oriented transverse to the feed direction are downwardly displaceable, while the bottom part (7) and the second side parts (10, 11) oriented parallel to the feed direction of the sealing tool are fixed in their spatial arrangement relative to a frame of the sealing tool.

2. The sealing tool according to claim 1, wherein the first side parts (8, 9) oriented transverse to the feed direction are vertically downwardly displaceable.

3. The sealing tool according to claim 1, wherein the second side parts (10, 11) oriented parallel to the feed direction have a low-friction surface on their tops.

4. The sealing tool according to claim 1, wherein at least one of the second side parts (10, 11) oriented parallel to the feed direction tapers downwardly from top to bottom of the sealing tool.

5. A process for sealing a package trough with a covering film with a bottom sealing tool according to claim 1, wherein:

the covering film and the package trough are fed into a sealing station and fixed and pressed between the bottom sealing tool and a top sealing tool, heated and thereby sealed, the downwardly displaceable side parts of the bottom sealing tool are lowered, and a finished package is moved on.

6. The process according to claim 5, wherein the downwardly displaceable parts are lowered vertically.

7. A sealing tool for sealing several package troughs with covering films, comprising a bottom part (12), a first side parts (13, 14) oriented transverse to a direction of package trough feed and a second side parts (15, 16) oriented parallel to a direction of package trough feed, and at least one middle part (17, 17a), wherein the first side parts (13, 14) oriented transverse to the feed direction are downwardly displaceable while the bottom part (12), the second side parts (15, 16) oriented parallel to the feed direction, and the middle part(s) (17, 17a) of the sealing tool are fixed in their spatial arrangement relative to a frame of the sealing tool.

8. The sealing tool according to claim 7, wherein the first side parts (13, 14) oriented transverse to the feed direction are vertically downwardly displaceable.

9. The sealing tool according to claim 8, wherein the side part (15) and/or the side part (16) taper(s) on an inward-facing side downwardly from top to bottom of the sealing tool.

10. The sealing tool according to claim 7, wherein the middle part (17) tapers on both sides from top to bottom of the sealing tool.

11. The sealing tool according to claim 7, wherein the middle part (17) and the second side parts (15, 16) oriented parallel to the feed direction have (a) low-friction-surface(s).

* * * * *